Patented Sept. 20, 1938

2,130,525

UNITED STATES PATENT OFFICE 2,130,525

HYDROXY ALKYL ETHERS OF HYDROGENATED HYDROXY DIPHENYL COMPOUNDS

Gerald H. Coleman and John W. Zemba, Midland, Mich., assignors to The Dow Chemical Company, Midland, Mich., a corporation of Michigan No Drawing. Application February 20, 1937, Serial No. 126,808

12 Claims. (Cl. 260—150)

This invention concerns the hydroxy-alkyl ethers of hydrogenated hydroxy-diphenyl compounds, e. g. compounds obtained by the catalytic hydrogenation of the phenyl phenols, and nuclear substituted derivatives thereof. These compounds have the following formula:

$$R—O—(C_nH_{2n})—OH$$

wherein R represents an hydrogenated hydroxyl-diphenyl residue, and $n$ is an integer greater than 1. The term "hydrogenated hydroxy-diphenyl", as herein employed, includes the cyclohexyl phenols, the phenyl cyclohexanols, the cyclohexyl cyclohexanols, and derivatives thereof containing unreactive substituents such as chlorine, bromine, alkyl, and aryl radicals, etc., attached to one or both of the 6-membered carbon rings.

We have prepared members of this class of compounds, determined certain physical characteristics thereof whereby they may be readily identified, and found that they are particularly useful in the preparation of compositions for the control of house-hold insect pests.

These new compounds may be prepared by reacting an hydrogenated hydroxy-diphenyl compound with a mono-halo-aliphatic alcohol, e. g. a halohydrin, etc., in the presence of a suitable alkali such as sodium hydroxide, potassium hydroxide, etc.

In preparing our new compounds, the hydrogenated hydroxy-diphenyl compound is generally dissolved in aqueous alkali and the halo-alcohol added thereto at a reaction temperature with stirring. The reaction may also be carried out by first mixing the hydrogenated derivative with the halo-alcohol and subsequently adding the alkali thereto. Good yields of the desired products can be obtained when equimolecular proportions of reactants are used. The reaction may be conveniently carried out at the refluxing temperature of the mixture, but lower or higher temperatures may be employed. In certain cases, where the reactants are not appreciably soluble in aqueous alkali, alcohol or other water-miscible organic solvent may be added to the reaction mixture. Following completion of the reaction, the mixture is allowed to stand and separate into layers, the oily layer being subsequently separated, and the desired compound isolated therefrom, as by fractional distillation under reduced pressure.

Our new compounds may also be prepared by reacting an hydrogenated hydroxy-diphenyl compound with an alkylene oxide in the presence of a suitable catalyst, e. g. sulfuric acid. The alkylene oxide, e. g. butylene oxide, etc., can be passed into a mixture of the hydrogenated hydroxy-diphenyl compound, catalyst, and an inert organic solvent, e. g. carbon tetrachloride, at temperatures below the boiling point of the reaction mixture. The mixture is stirred until the reaction is substantially complete and thereafter washed successively with aqueous alkali and water, and fractionally distilled to obtain the desired hydroxy-alkyl ether product.

The following examples describe the preparation of certain representative members of our new group of compounds, but are not to be construed as limiting the invention:

Example 1

A mixture of 5 mols of 2-cyclohexyl-phenol, 5 mols of sodium hydroxide, and 1 liter of 50 per cent aqueous ethanol was warmed to 70° C. with stirring, and 5 mols of ethylene chlorohydrin as a 42 per cent aqueous azeotrope slowly added thereto over a period of 2 hours and at a temperature of 60°–65° C. The reaction mixture was agitated for an additional 2 hours, diluted with 1 liter of water, and allowed to stand until stratification occurred. The oily layer was then separated and fractionally distilled whereby 4.04 mols of the beta-hydroxy-ethyl ether of 2-cyclohexyl phenol was obtained as a viscous liquid boiling at 161°–163° C. at 4 millimeters pressure and having a specific gravity of 1.061 at 20°/4° C. This compound was substantially insoluble in water but somewhat soluble in most organic solvents.

Example 2

In a similar manner 1 mol. each of 2-cyclohexyl-4-chloro-phenol, sodium hydroxide, and ethylene chlorohydrin were reacted together in 350 milliliters of water at a temperature of 65°–70° C., whereby the beta-hydroxy-ethyl ether of 2-cyclo-hexyl-4-chloro-phenol was obtained as a colorless oil boiling at 166° to 168° C. at 4 millimeters pressure.

Example 3

2 mols of ethylene oxide was passed into a mixture of 2 mols of 2-cyclohexyl-cyclohexanol (boiling point 150°–153° C. at 10 millimeters pressure), 2 milliliters of concentrated sulphuric acid, and 250 milliliters of carbon tetrachloride over a period of approximately 4 hours and at temperatures ranging between 10° and 20° C. The reaction mixture was then agitated for 3 hours at room temperature and allowed to stand for several days. The resulting product was successively washed with 10 per cent aqueous sodium hydroxide solution and with water and fractionally distilled to obtain the beta-hydroxy-ethyl ether of 2-cyclohexyl-cyclohexanol as a colorless liquid boiling at 135°–137° C. at 4 millimeters pressure, and having the specific gravity 1.020 at 20°/4° C.

*Example 4*

1.36 mols of ethylene oxide, 1 mol. of 2-phenyl-cyclohexanol (boiling at 158°–159° C. at 25 millimeters pressure), 200 milliliters of carbon tetrachloride, and 2 grams of concentrated sulphuric acid were reacted together substantially as described in Example 3. The resulting product was washed free of acid and fractionally distilled under reduced pressure to obtain the beta-hydroxy-ethyl ether of 2-phenyl-cyclohexanol as a colorless liquid boiling at 123°–123.5° C. at 3 millimeters pressure, and having a specific gravity of 1.045 at 20°/4° C.

*Example 5*

1 mol. of 4-cyclohexyl phenol was mixed with 1 mol. of sodium hydroxide and 250 milliliters of water, and 1 mol. of propylene chloro-hydrin as a 51 per cent azeotrope reacted therewith over a period of 1 hour and at a temperature of approximately 55° C. The reaction mixture was thereafter stirred at 65° C. for 2 hours, cooled, and the oily layer thereof fractionally distilled under reduced pressure, 150 grams of the desired ether product being thereby obtained. The hydroxy-propyl ether of 4-cyclohexyl phenol is a white crystalline solid melting at 75°–76° C. upon recrystallization from ligroin.

*Example 6*

2 mols of 2-cyclohexyl phenol, 2 mols of isobutylene oxide, and 2 grams of concentrated sulphuric acid were reacted together in 400 milliliters of carbon tetrachloride substantially as described in Example 3. The reaction mixture was fractionally distilled, whereby there was obtained the hydroxy-butyl ether of 2-cyclohexyl phenol as a colorless liquid boiling at 146°–148° C. at 3–4 millimeters pressure, and having a specific gravity of 1.024 at 20°/4° C.

Other compounds prepared in a similar manner include the following:

Beta-hydroxy-ethyl ether of 4-cyclohexyl phenol, a white crystalline solid boiling between 169° and 173° C. at 4 millimeters pressure, and having a melting point of 62°–63° C.;

Hydroxy-propyl ether of 2-cyclohexyl phenol, a colorless liquid boiling at 147°–149° C. at 3 millimeters pressure and having a specific gravity of 1.0289 at 20°/4° C.

Other hydrogenated hydroxydiphenyl compounds, halo-alcohols, and alkylene oxides may be substituted for those shown in the examples to obtain a large number of hydroxy-alkyl ether compounds falling within the scope of this invention, e. g. beta-hydroxy-ethyl ether of 3-cyclohexyl phenol; beta-hydroxy-ethyl ether of 3-phenyl-cyclohexanol; beta-hydroxy-ethyl ether of 4-phenyl-cyclohexanol; beta-hydroxy-ethyl ether of 3-cyclohexyl-cyclohexanol; beta-hydroxy-ethyl ether of 4-cyclohexyl-cyclohexanol; beta-hydroxy-ethyl ether of 2-cyclohexyl-3-chloro-phenol; beta-hydroxy-ethyl ether of 2-cyclohexyl-5-chloro-phenol; beta-hydroxy-ethyl ether of 2-cyclohexyl-6-chloro-phenol; beta-hydroxy-ethyl ether of 2-(2-chloro-cyclohexyl)phenol; beta-hydroxy-ethyl ether of 2-(3-chloro-cyclohexyl)-phenol; beta-hydroxy-ethyl ether of 2-(4 - chloro - cyclohexyl) - phenol; beta-hydroxy-ethyl ether of 2-cyclohexyl-3-bromo-phenol; beta-hydroxy-ethyl ether of 2-cyclohexyl-4-bromo-phenol; beta-hydroxy-ethyl ether of 2-cyclohexyl-5-bromo-phenol; beta-hydroxy-ethyl ether of 2-cyclohexyl-6-bromo-phenol; beta-hydroxy-ethyl ether of 2-(2-bromo-cyclohexyl)-phenol; beta-hydroxy-ethyl ether of 2-(3-bromo-cyclohexyl)-phenol; beta-hydroxy-ethyl ether of 2-(4-bromo-cyclohexyl)-phenol; beta-hydroxy-ethyl ether of 2,4-dichloro-6-cyclohexyl phenol; beta-hydroxy-ethyl ether of 2-cyclohexyl-3,6-dichloro-phenol; beta-hydroxy-ethyl ether of 2-(4-chloro-cyclohexyl)-4-chloro-phenol; beta-hydroxy-ethyl ether of 2-cyclohexyl-4,6-dibromo-phenol; beta-hydroxy-ethyl ether of 2-(3-chloro-cyclohexyl)-4-bromo-phenol; beta-hydroxy-ethyl ether of 3-cyclohexyl-4-chloro-phenol; beta-hydroxy-ethyl ether of 3-cyclohexyl-6-chloro-phenol; beta-hydroxy-ethyl ether of 3-cyclohexyl-4-bromo-phenol; beta-hydroxy-ethyl ether of 3-cyclohexyl-6-bromo-phenol; beta-hydroxy-ethyl ether of 3-cyclohexyl-4-bromo-6-chloro-phenol; beta-hydroxy-ethyl ether of 3-(4-chloro-cyclohexyl)phenol; beta-hydroxy-ethyl ether of 3-(2-chloro-cyclohexyl)-4-bromo-phenol; beta-hydroxy-ethyl ether of 2-chloro-4-cyclohexyl phenol; beta-hydroxy-ethyl ether of 2,6-dichloro-4-cyclohexyl phenol; beta-hydroxy-ethyl ether of 3-chloro-4-cyclohexyl phenol; beta-hydroxy-ethyl ether of 2-bromo-4-cyclohexyl phenol; beta-hydroxy-ethyl ether of 2,6-dibromo-4-cyclohexyl phenol; beta-hydroxy-ethyl ether of 2-bromo-4-cyclohexyl-6-chloro-phenol; beta-hydroxy-ethyl ether of 4-(4-bromo-cyclohexyl)-phenol; beta-hydroxy-ethyl ether of 4-(2-chloro-cyclohexyl)-phenol; beta-hydroxy-ethyl ether of 4-(2-chloro-cyclohexyl)-6-chloro-phenol; beta-hydroxy-ethyl ether of 2-cyclohexyl-4-methyl phenol; beta-hydroxy-ethyl ether of 2-methyl-4-cyclohexyl phenol; beta-hydroxy-ethyl ether of 2-cyclohexyl-4-tertiary-butyl phenol; beta-hydroxy-ethyl ether of 2-cyclohexyl-4-tertiary-butyl-6-chloro-phenol; beta-hydroxy-ethyl ether of 2-cyclohexyl-4-benzyl phenol; beta-hydroxy-ethyl ether of 2-(3-methyl-cyclohexyl)-phenol; beta-hydroxy-ethyl ether of 4-(1-methyl-cyclohexyl)-phenol; beta-hydroxy-ethyl ether of 4-(1-phenyl-cyclohexyl)-phenol; beta-hydroxy-ethyl ether of 2-cyclohexyl-6-methoxy-phenol; beta-hydroxy-ethyl ether of 2-ethoxy-4-cyclohexyl phenol; beta-hydroxy-ethyl ether of 2-phenyl-4-chloro-cyclohexanol; beta-hydroxy-ethyl ether of 4-phenyl-6-methyl-cyclohexanol; beta-hydroxy-ethyl ether of 4-(4-bromo-phenyl)-2-methyl-cyclohexanol; beta-hydroxy-ethyl ether of 4-(4-bromo-phenyl)-2-chloro-cyclohexanol; beta-hydroxy-ethyl ether of 4-cyclohexyl-6-chloro-cyclohexanol; beta-hydroxy-ethyl ether of 2-cyclohexyl-4-tertiary-butyl-cyclohexanol; beta-hydroxy-ethyl ether of 2-(3-methyl-cyclohexyl)-cyclohexanol; beta-hydroxy-ethyl ether of 4-(1-phenyl-cyclohexyl)-cyclohexanol; hydroxy-propyl ether of 3-cyclohexyl phenol; hydroxy-propyl ether of 2-phenyl-cyclohexanol; hydroxy-propyl ether of 4-cyclohexyl-cyclohexanol; hydroxy-propyl ether of 2-cyclohexyl-4-chloro-phenol; hydroxy-propyl ether of 2-cyclohexyl-6-chloro-phenol; hydroxy-propyl ether of 2,4-dichloro-6-cyclohexyl phenol; hydroxy-propyl ether of 2-cyclohexyl-4-bromo-phenol; hydroxy-propyl ether of 2-cyclohexyl-6-bromo-phenol; hydroxy-propyl ether of 2-cyclohexyl-4,6-dibromo-phenol; hydroxy-propyl ether of 3-cyclohexyl-4-chloro-phenol; hydroxy-propyl ether of 3-cyclohexyl-4,6-dibromo-phenol; hydroxy-propyl ether of 2-chloro-4-cyclohexyl phenol; hydroxy-propyl ether of 2,6-dichloro-4-cyclohexyl phenol; hydroxy-propyl ether of 2-bromo-4-cycohexyl phenol; hydroxy-propyl ether of 2,6-dibromo-4-cyclohexyl phenol; hydroxy-propyl ether of 2-methyl-4-cyclohexyl phenol; hydroxy-propyl ether of 2-(3-methyl-cyclohexyl)-phenol; hydroxy-propyl ether of 4-(1-methyl-cyclohexyl)-phenol; hydroxy-propyl ether of 4-(1-phenyl-cyclohexyl)-phenol; hydroxy-propyl ether of 2-methoxy-4-cyclohexyl phenol; hydroxy-butyl ether of 3-cyclohexyl phenol; hydroxy-butyl ether of 4-cyclohexyl phenol; hydroxy-butyl ether of 2-phenyl-cyclohexanol; hydroxy-butyl ether of 4-phenyl-cyclohexanol; hydroxy-butyl ether of 2-cyclohexyl-cyclohexanol; hydroxy-butyl ether of 4-cyclohexyl-cyclohexanol; hydroxy-butyl ether of 2-cyclohexyl-4-chloro-phenol; hydroxy-butyl ether of 2-cyclohexyl-4,6-dichloro-phenol; hydroxy-butyl ether of 2,6-dichloro-4-cyclohexyl phenol; hydroxy-butyl ether of 2,6-dibromo-4-cyclohexyl phenol; hydroxy-pentyl ether of 2-cyclohexyl phenol; hydroxy-pentyl ether of 4-cyclohexyl phenol; hydroxy-pentyl ether of 2-phenyl-cyclohexanol; hydroxy-pentyl ether of 2-cyclohexyl-cyclohexanol; hydroxy-pentyl ether of 2-cyclohexyl 4-chloro-phenol; hydroxy-pentyl ether of 2-chloro-4-cyclohexyl phenol; hydroxy-pentyl ether of 2,6-dichloro-4-cyclohexyl phenol; etc.

Representative members of the above-described group of compounds have been tested by the Peet-Grady method as described in Soap, 8, No. 4, 1932, and found to be particularly useful as fly spray toxics. For example, a 5 per cent solution of the beta-hydroxy-ethyl ether of 2-cyclohexyl phenol in kerosene, when tested against 3-day old house flies, showed a 77 per cent knockdown and a kill of 32.4 per cent after 24 hours. The beta-hydroxy-ethyl ether of 4-cyclohexyl phenol in 5 per cent kerosene solution killed 19.3 per cent of the flies contacted therewith.

Other modes of applying the principle of our invention may be employed instead of those explained, change being made as regards the materials employed provided the products described in the following claims be thereby obtained.

We, therefore, particularly point out and distinctly claim as our invention:

1. A compound having the formula:

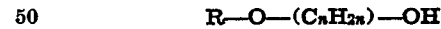

wherein $n$ is an integer greater than 1, and R represents an hydrogenated hydroxy-diphenyl residue selected from the class consisting of the cyclohexyl-phenyl, phenyl-cyclohexyl, and cyclohexyl-cyclohexyl radicals and analogues thereof containing substituents non-reactive with acids and alkalies in the etherification reaction.

2. A compound having the formula:

wherein $n$ is an integer from 2 to 4, inclusive, and R represents an hydrogenated hydroxy-diphenyl residue selected from the class consisting of the cyclohexyl-phenyl, phenyl-cyclohexyl, and cyclohexyl-cyclohexyl radicals and analogues thereof containing substituents non-reactive with acids and alkalies in the etherification reaction.

3. A beta-hydroxy-ethyl ether of an hydrogenated hydroxy-diphenyl compound having the formula:

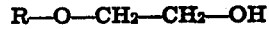

wherein R represents an hydrogenated hydroxy-diphenyl residue selected from the class consisting of the cyclohexyl-phenyl, phenyl-cyclohexyl, and cyclohexyl-cyclohexyl radicals and analogues thereof containing substituents non-reactive with acids and alkalies in the etherification reaction.

4. An hydroxy-propyl ether of an hydrogenated hydroxy-diphenyl compound having the formula:

wherein R represents an hydrogenated hydroxy-diphenyl residue selected from the class consisting of the cyclohexyl-phenyl, phenyl-cyclohexyl, and cyclohexyl-cyclohexyl radicals and analogues thereof containing substituents non-reactive with acids and alkalies in the etherification reaction.

5. An hydroxy-alkyl ether of a cyclohexyl phenol having the formula:

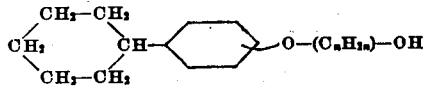

wherein $n$ is an integer greater than 1.

6. An hydroxy-alkyl ether of a cyclohexyl phenol having the formula:

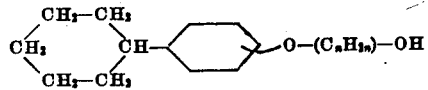

wherein $n$ is an integer from 2 to 4, inclusive.

7. The beta-hydroxy-ethyl ether of cyclohexyl phenol.

8. An hydroxy-propyl ether of cyclohexyl phenol.

9. An hydroxy-butyl ether of cyclohexyl phenol.

10. An hydroxy-alkyl ether of 2-cyclohexyl phenol having the formula:

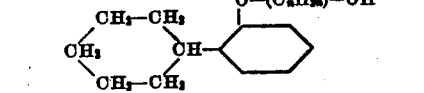

wherein $n$ is an integer from 2 to 4, inclusive.

11. Beta-hydroxy-ethyl ether of 2-cyclohexyl phenol.

12. Hydroxy-propyl ether of 2-cyclohexyl phenol, a colorless liquid boiling between 147° and 149° C. at 3 millimeters pressure, and having a specific gravity of 1.0289 at 20°/4° C.

GERALD H. COLEMAN.
JOHN W. ZEMBA.